Jan. 8, 1952 R. E. WALLACE ET AL 2,581,776
BALING MACHINE
Filed May 31, 1946 8 Sheets-Sheet 1

Inventors.
Richard Edgar Wallace.
Deceased.
by Frances N. Wallace.
Executrix.
Thomas R. Sykes.
by HJS Dennison. Atty.

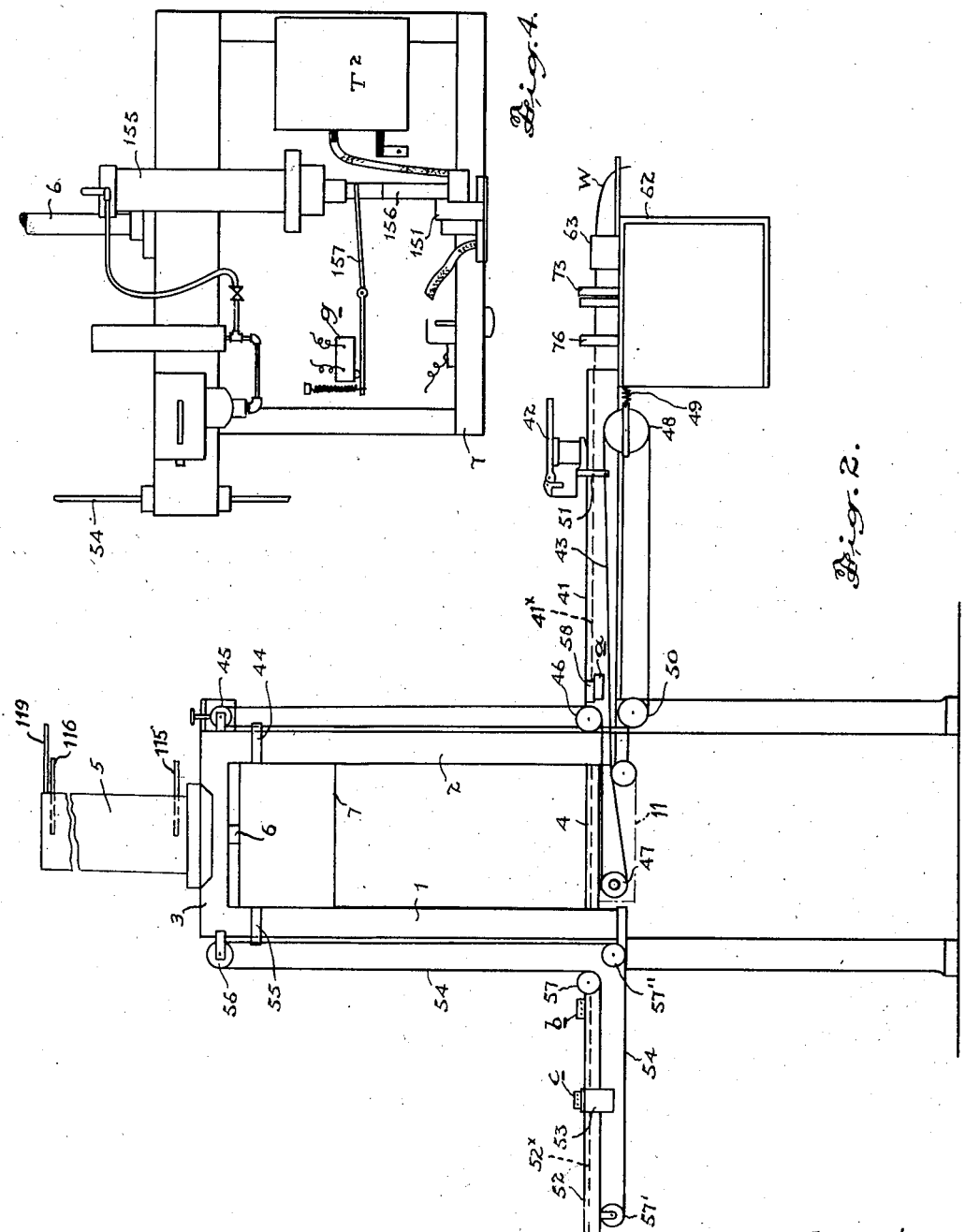

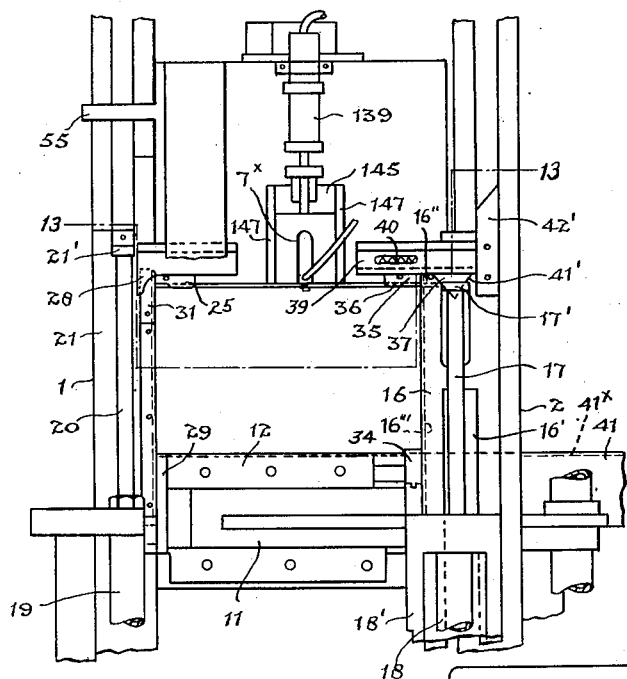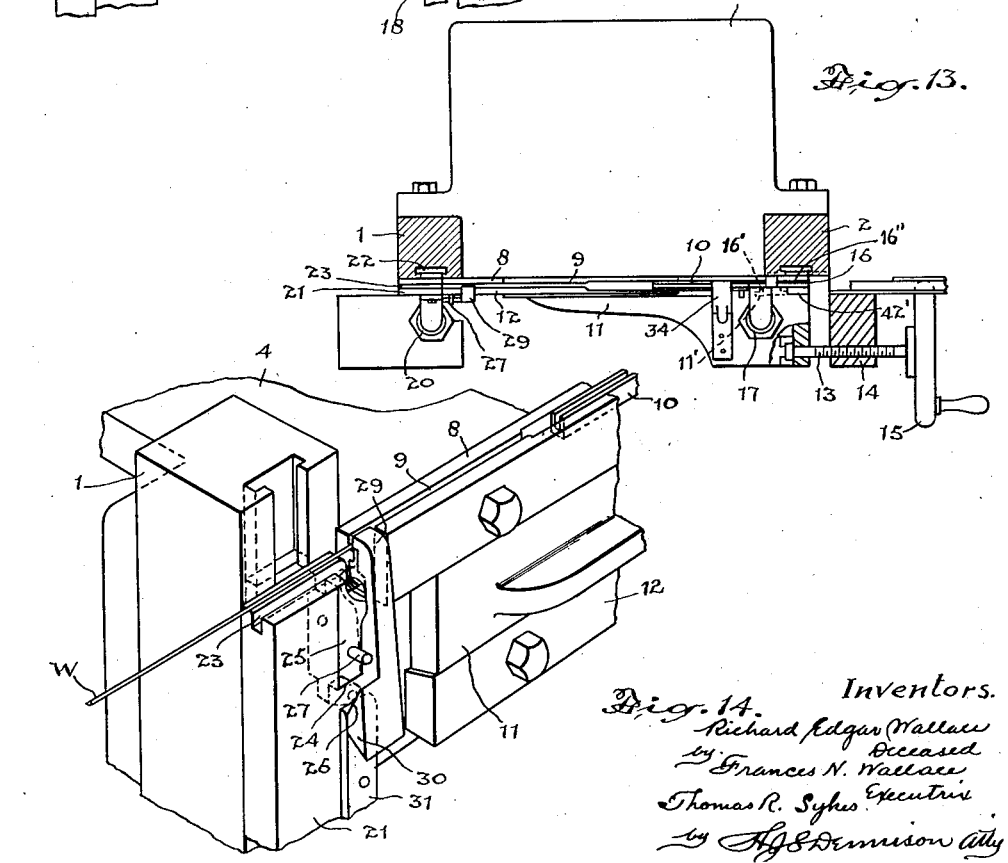

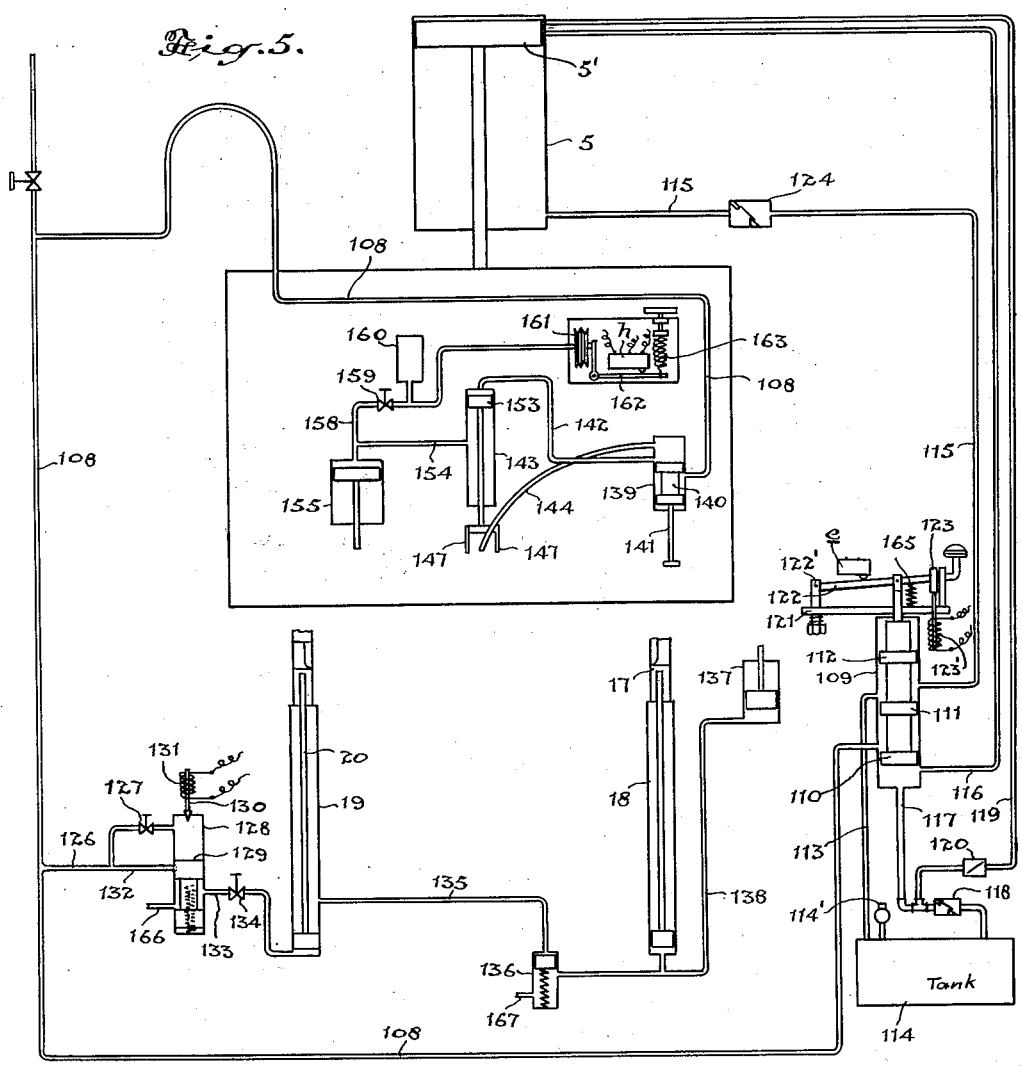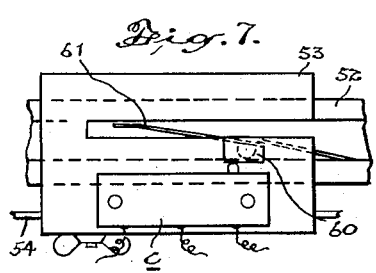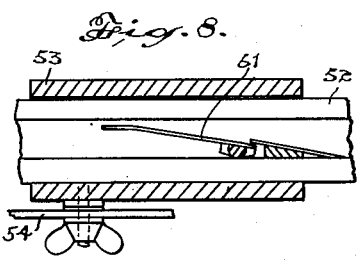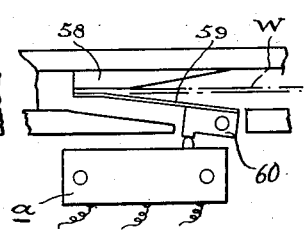

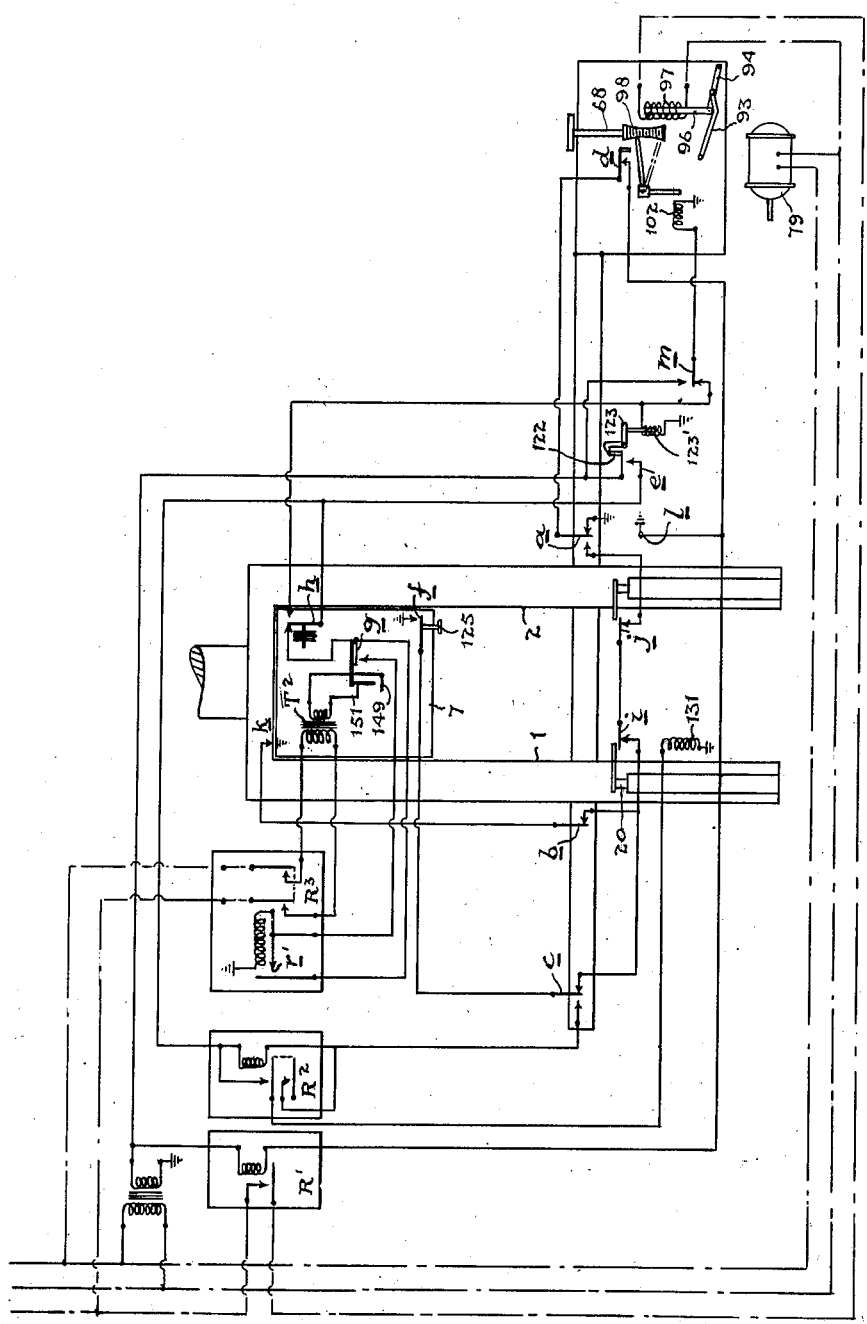

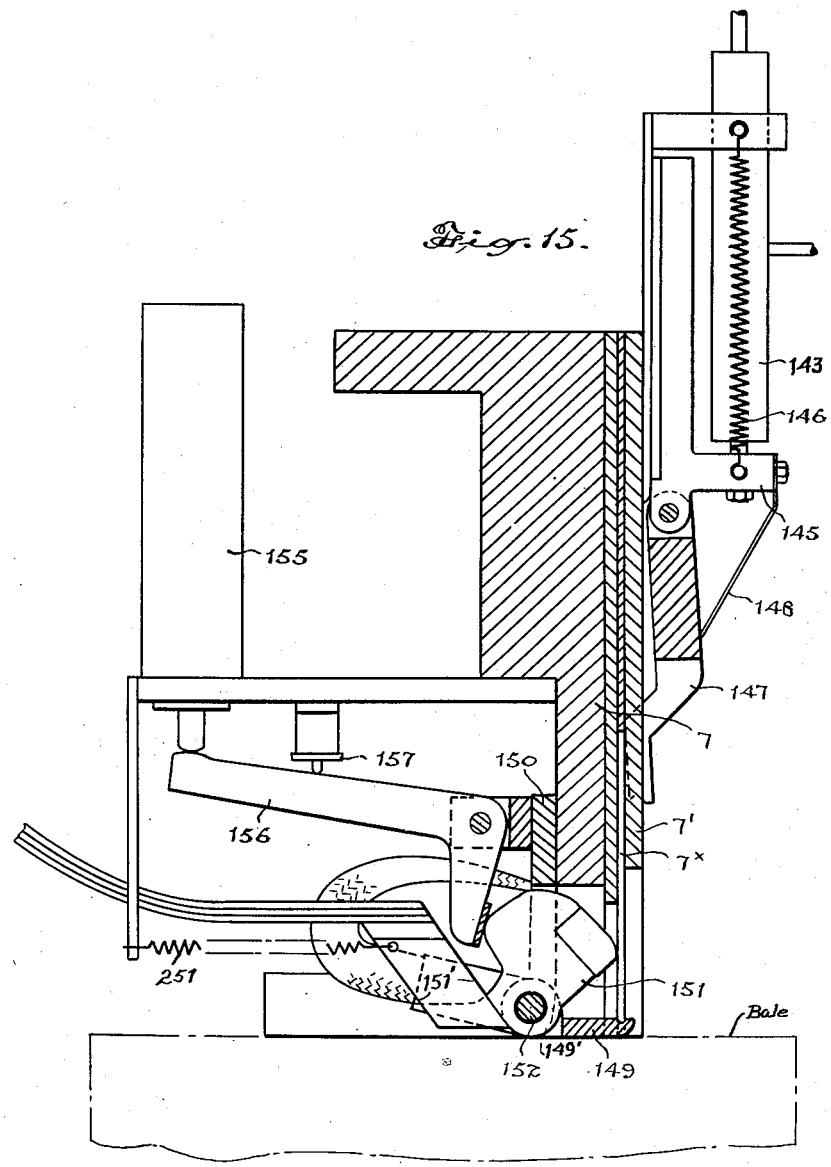

Jan. 8, 1952  R. E. WALLACE ET AL  2,581,776
BALING MACHINE
Filed May 31, 1946  8 Sheets-Sheet 8
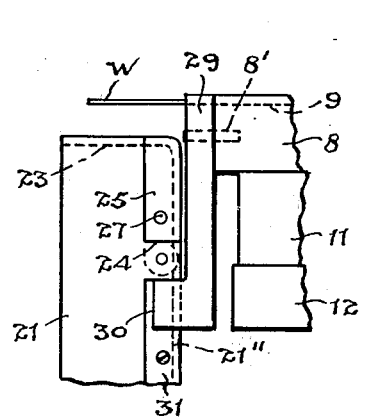
FIG.17.
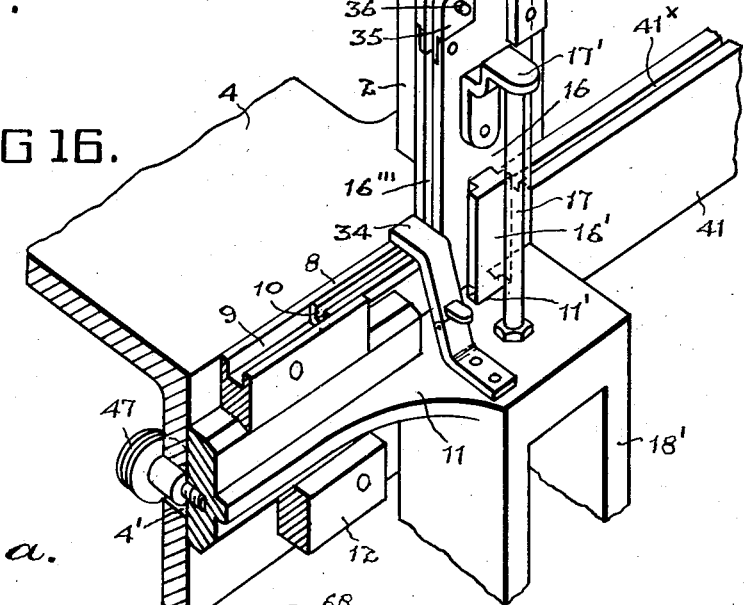
FIG 16.
FIG.12 a.
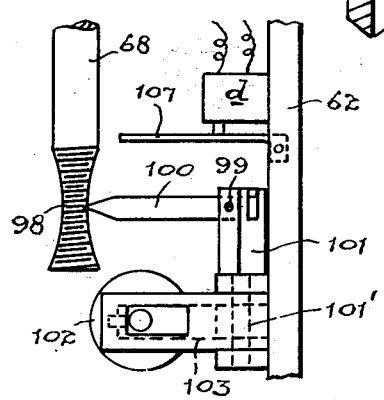
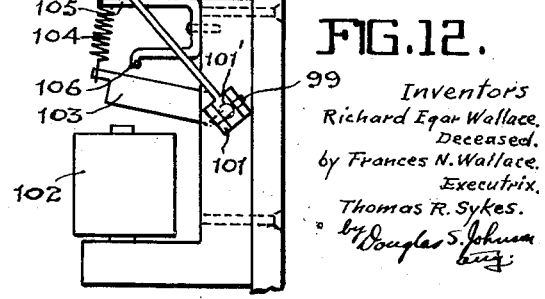
FIG.12.
Inventors
Richard Egar Wallace,
Deceased.
by Frances N. Wallace,
Executrix.
Thomas R. Sykes.
by Douglas S. Johnson Patented Jan. 8, 1952

2,581,776

UNITED STATES PATENT OFFICE 2,581,776

BALING MACHINE

Richard Edgar Wallace, deceased, late of Toronto, Ontario, Canada, by Frances N. Wallace, executrix, Toronto, Ontario, Canada, and Thomas R. Sykes, Toronto, Ontario, Canada, assignors, by mesne assignments, to The Toronto Star Limited, Toronto, Ontario, Canada Application May 31, 1946, Serial No. 673,375

17 Claims. (Cl. 100—31)

This invention relates to improvements in machines for baling newspapers or other compressible material and particularly to a machine such as shown and described in United States Patent No. 2,331,818 of October 12, 1943, to R. E. Wallace, and the principal objects of this invention are to provide improved and simplified wire feed and wire measuring means which will materially increase the speed of operation and will render the machine more accurate and dependable in its operation and further, to improve the wire welding mechanism.

A further important object is to render the machine semi-automatic so that after placing the bundle on the bed plate and manually operating the starting mechanism, the machine compresses the bundle, feeds, measures and cuts the wire the proper length to encircle the bundle, folds the wire around the compressed bundle, welds the ends of the wires together, releases the bundle and feeds the wire to an initial position for the next cycle of operations.

One of the principal features of the present invention consists in the novel arrangement of electrical switches in the path of movement of the wire to control a solenoid operated clutch in the wire feeding mechanism to move the wire to an initial position for the next bundle before the cycle of operations of the machine is completed and to complete the movement of the wire and measure same to suit the dimensions of the succeeding bundle.

Another important feature consists in the coordination of a mobile switch and the wire-cutting means for measuring the limit of the length of wire for a bundle.

A further important feature consists in the novel arrangement and coupling of pressure air-operated means for compressing the bundle, cutting the wire, folding the wire around the bundle, operating the welding mechanism and returning the bundle compressing ram to its raised position at the end of the cycle of operations.

The machine shown and described in the aforesaid patent comprised primarily the arrangement of cooperating mechanisms whereby a pressure ram operates to compress the material of the bundle upon a fixed bed plate, means being connected with the ram to automatically measure and cut a length of wire to surround the bundle, the wire being fed beneath the bundle and immediately following the cutting the ends are bent upwardly along the sides of the bundle and then bent inwardly over the top thereof with the ends overlapping, and the overlapping ends are gripped and welded together.

In the patented machine the wire measuring mechanism was operatively controlled by a cable connected with the ram of the press.

The improved machine is illustrated in the accompanying drawings in which

Figure 2 is a diagrammatic elevational view of the machine showing the cable arrangement for controlling the wire lengths.

Figure 3 is an enlarged front elevational view of the ram and wire folding mechanism.

Figure 4 is an enlarged rear elevational view of the ram and the wire welding arrangement.

Figure 5 is a diagrammatic view of the pressure air system of the machine.

Figure 6 is a diagrammatic view of the electrical system.

Figure 7 is an enlarged plan view of the movable cable controlled wire feed switch.

Figure 8 is a horizontal plan section through the switch shown in Figure 7 showing the wing nut for securing switch carriage to moving cable.

Figure 9 is an enlarged plan view of the fixed wire feed switch located on the feed side of the ram.

Figure 12 is an enlarged sectional detail of the overtravel limit switch taken on the line 12—12 of Figure 10.

Figure 12A is an enlarged elevational detail of the over-travel limit switch.

Figure 13 is an enlarged horizontal plan sectional detail taken on the line 13—13 of Figure 3 and broken away in part to disclose the transverse adjustment means for adapting the device to bundles of various widths.

Figure 14 is an enlarged sectional perspective detail showing part of the mechanism illustrated in Figure 13 and illustrating the manner of gripping and holding the wire to form a right angle bend without pressure on the bundle.

Figure 15 is an enlarged sectional detail of the means for welding the ends of the wires together.

Figure 16 is a perspective section illustrating the right-hand side of the machine.

Figure 17 is an elevational detail of the left-hand portion of Figure 14 showing the wire-gripping dog and the pivotal wire bending block.

Figure 1:
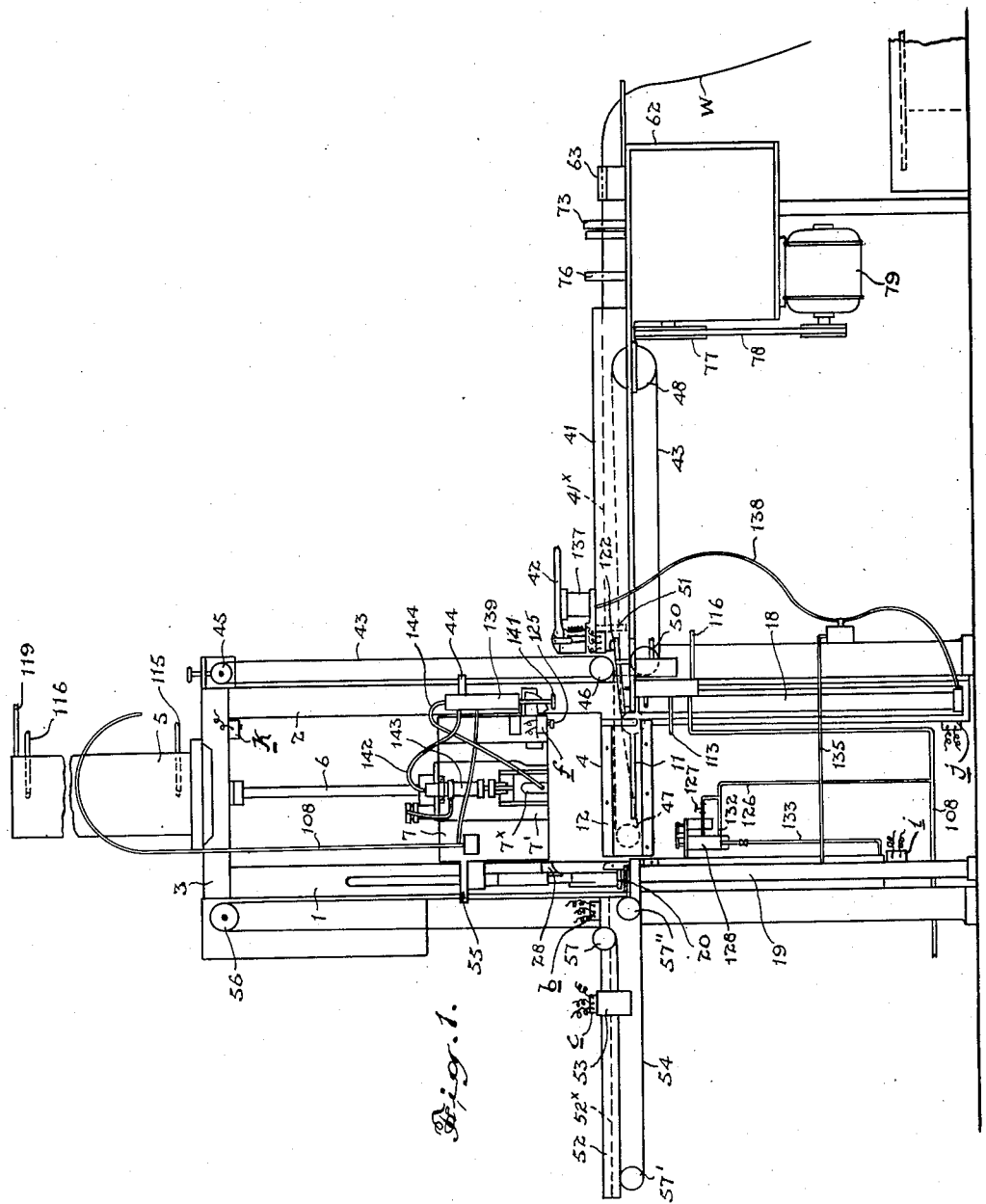
Figure 1 is a front elevational view.

In the construction herein shown the main frame of the machine comprises a pair of uprights 1 and 2 rigidly connected at the top by a cross bar 3 and intermediate of their height by a horizontal bed plate 4.

An air cylinder 5 is centrally mounted on the cross bar 3 and a piston rod 6 extending therefrom supports the ram 7 which slidably engages the uprights 1 and 2 of the frame and operates to compress a bundle on the bed plate 4.

A horizontal bar 8 is mounted on the front edge of the bed plate 4 and is formed with a groove 9 in its upper edge as shown in Figures 13 and 14 into which the binder wire is guided to pass under the bundle placed upon the bed plate. It will be noted that the right hand end of this groove is widened to slidably support a grooved bar 10 mounted on a bracket plate 11 slidably mounted between the bar 8 and a similar bar 12 secured to the bed plate.

The bracket plate 11 is adjusted horizontally in accordance with the width of the bundle by a spindle 13, as shown in Figure 13, threaded in a block 14 on the frame and provided with a hand wheel 15.

A plate 16 Figure 16 connected to a piston ram 17 is mounted to slide vertically in the plate 11 adjacent to the upright 2 with a dovetailed rib 16' of the plate 16 engaging in the correspondingly shaped groove 11' of bracket 11 and the piston ram operates in a cylinder 18 carried in a frame 18' mounted on the plate 11.

The top and inner vertical edges of the plate 16 are provided with grooves 16" and 16''' with the groove 16" in alignment with the grooved bar 10 to receive the binding wire.

A cylinder 19 is rigidly mounted on the upright 1 of the frame and carries a ram 20 which is connected to a plate 21 slidably mounted in a vertical grooved slot 22 in the upright.

The plate 21 is formed with a grooved inner vertical edge 21'', Figure 17, to receive and hold the binding wire in a vertical position when said plate is moved upwardly and it is also provided with a groove 23 in its upper edge, see Figures 14 and 17, to receive the end of the wire projected through the slot 9.

A notch 24 is formed in the upper inner corner of the plate 21 and a block 25 is pivotally mounted therein on a pin 26. The top of the block 25 is grooved to form a continuation of the groove 23.

A pin 27 projects from the block 25 and is engaged by the curved surface of a cam bar 28 mounted on the ram 7, see Figure 3, and swings the block 25 inwardly and thus bends the wire end inwardly.

A gripper dog 29, Figures 14 and 17, is pivoted to the bar 8 at 8' in a notch formed at the end of the bar 8 adjacent to the sliding plate 21 and it is swung on its pivot to grip the wire W in the slot 9 by the engagement of its bevelled end 30 by the plate 31 carried by the plate 21 as said plate moves upwardly.

The operation is that when the upward movement of plate 21 commences, the dog 29 grips the wire securely at the end of the groove 9 and the plate then bends the wire upwardly in a sharp right angle bend without exerting any upward pressure against the corner of the bundle.

The plate 21 moves upwardly supporting the upturned wire vertically in its grooved edge and when the cam 28 engages the pin 27 it swings the block 25 to bend the end of the wire inwardly over the bundle, as shown in Figure 3.

Concurrently with the operation of the plate 21 the ram 17 moves the plate 16 upwardly, and the other end of a cut and measured length of wire is bent upwardly at right angles against the pivotal plate 34, as shown in Figures 3 and 13.

The plate 16 has pivotally mounted adjacent to its upper end a block 35, similar to the block 25 (Figure 16), which has a projecting pin 36 which engages a cam 37 mounted on the ram 7. The cam 37 is slidably mounted on a plate 39 on the ram and operates against a suitable spring 40 compressed against stop 40'. This sliding cam arrangement is provided to accommodate different widths of bundles and corresponds with the adjustment of the frame 16 by the spindle 13.

A bevelled cam surface 41' on the outer side of the cam 37 is engaged by a bevelled block 42' mounted on the plate 16 so that as plate 16 is raised, the block 42' engages the cam surface 41' and pushes the member 37 inwardly to the desired position so that when the plate 16 moves further upwardly the pin 36 of the wire-bending block 35 is engaged by the cam 37 to swing the block inwardly, thus bending the wire end over the top of the bundle.

The wires are measured and cut to such a length for each bundle by the mechanism hereinafter described that the ends overlap a short distance midway of the top of the bundle where they are pressed into engagement and gripped and welded together as will be described.

The wire is fed to the grooved bars 10 and 8 along a bar 41 having a groove 41× which extends horizontally from the right side of the frame upright 2. Slidably mounted on the bar 41 is a suitable wire cutting device 42 which is caused to travel on the bar 41 by means of an endless cable 43. This cable is connected to a lug 44 extending from the ram 7 and extends upwardly passing over a pulley 45 adjustably mounted at the top of the frame and returning downwardly it passes over a pulley 46 and thence extends horizontally beneath the bed plate 4, around a pulley 47 mounted on the back of the bracket 11 and operating in a slot 4' in the front wall of the bed plate 4 so that transverse movement of the bracket to accommodate different widths of bundles will alter the position of the cable correspondingly. From the pulley 47 the cable returns horizontally and extends beneath the bar 41 passing around a pulley 48 which is held under tension by a spring 49 and from thence it returns horizontally and passes over a pulley 50 mounted on the frame and then returns upwardly to the lug 44. The sliding carriage of the wire cutter 42 is provided with an extension 51 which is secured to the cable. The spring 49 holds the cable taut and the adjustable pulley 45 enables the adjustment of the cutter to provide the correct length of overlap of the wire when folded around the bundle.

The cable 43 and the slidable cutter operated thereby are operated directly by the movement of the ram 7 as it compresses the bundle so that the length of wire on the right-hand side is determined, the cutter being operated as hereinafter described.

A bar 52 having a groove 52× and aligned horizontally with the bar 41 and extending from the left upright 1 of the frame has a slidable carriage 53 mounted thereon carrying a control switch to be hereinafter described.

An endless cable 54 is connected to a lug 55 extending from the left side of the ram 7 and extends over a pulley 56 mounted at the top of the frame and returns downwardly under a pulley 57 from whence it extends horizontally beneath the bar 52 and around an end pulley 57', the cable being secured to the switch carriage 53. The cable after passing around the pulley 57' returns and passing under a pulley 57" it returns upwardly to the ram lug 55.

The movement of the ram thus causes the switch carriage 53 to move with a movement corresponding to the movement of the wire cutter 42.

The bundle binding wire is fed along the groove in the bar 41 by a mechanism to be hereinafter described and arranged in the bar groove at the right side of the frame and adjacent thereto is a bevelled wire guide block 58 and on the opposite side of the groove is a pivotal lever 59 spring-held toward said guide which is provided with a block extension 60 which, on the swinging of the lever by the insertion of the wire end fed along the slot, engages the actuating button of an electric micro-switch $a$, as illustrated in Figure 9. This switch is used to stop the feed of wire, in a manner later described, when fed to this point during the operation of folding and welding the previously fed length of wire around a bundle, thus saving time in successive operations.

After the ram 7 has returned to the upper position and the wire bending rams 17 and 20 have returned to their inoperative position the wire is advanced across the bed plate in the groove 9 in the bar 8 and it is again arrested through the operation of a switch $b$ similar to the switch $a$.

Mounted on the cable operated carriage 53 is a micro-switch $c$ which is operated by a pivotal lever 61 extending into the wire slot of the bar 52 extending to the left of the frame as shown in Figures 7 and 8.

Figure 10:
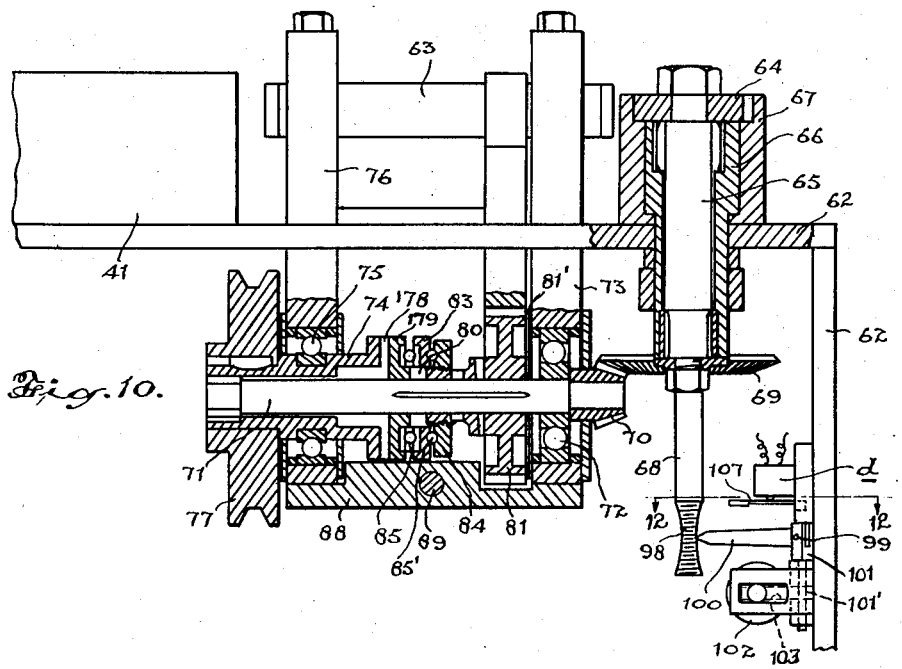
Figure 10 is an enlarged elevational view in part vertical section of the wire feed mechanism.

The wire feed mechanism is supported by a frame 62 mounted at the outer end of the bar 41. Mounted on top of the frame and aligned with the slot in the bar 41 is a suitable form of rotary wire straightening device 63 to which the wire W from a supply coil is fed by a pair of gripping rollers 64, the detail of one of which is illustrated in Figure 10.

One of the rollers 64 which is shown not driven is mounted on a vertical spindle 65 journalled within an eccentric bushing 66 which is rotatable in the block 67 which permits this roller to be moved toward and from the driven roller so that the feed may be released to change wire.

The spindle 68 of the driven roller has mounted thereon a bevel gear 69 meshing with a pinion 70 mounted on a horizontal shaft 71 which is journalled at the pinion end in a bearing 72 mounted in an upright support 73 which supports one end of the wire straightener 63.

On the other end of the shaft 71 is journalled a sleeve 74 which is supported in a bearing 75 mounted in an upright 76 which supports the other end of the wire straightener.

Keyed to the outer end of the sleeve 74 is a pulley 77 which is driven continuously by a belt 78 from an electric motor 79 mounted on the underside of the frame 62.

The inner end of the sleeve 74 is formed with a toothed clutch plate 178. A toothed clutch plate 179 adapted to engage the plate 178 is slidably mounted on a splined shaft 71 and is formed with a longitudinally slotted hub 80. A gear wheel 81 is splined on the shaft 71 and rotates with the clutch 178 when engaged. The gear 81 when disengaged from the clutch 178 moves into contact with a friction face 81' on the member 73 and is thus quickly brought to rest following the declutching operation.

A ring 83 rotatably mounted on the hub 80 of the clutch plate 179 is held thereon by a ring 84 threaded on the end of the hub and thrust bearings 85 and 85' are interposed between the rings 83 and 84 and the clutch plate 179.

The loose ring 83 is provided with pins 86 on its perimeter which are pivotally engaged by fork members 87. A bar 88 extending between the lower ends of the uprights 73 and 76 forms the pivot support for a shaft 89 extending transversely thereof to the ends of which the forks 87 are secured. The rotation of the shaft 89 thus operates the clutch to engage or disengage and the clutch teeth are bevelled to assist in the disengaging of the clutch members 178 and 179.

Figure 11:
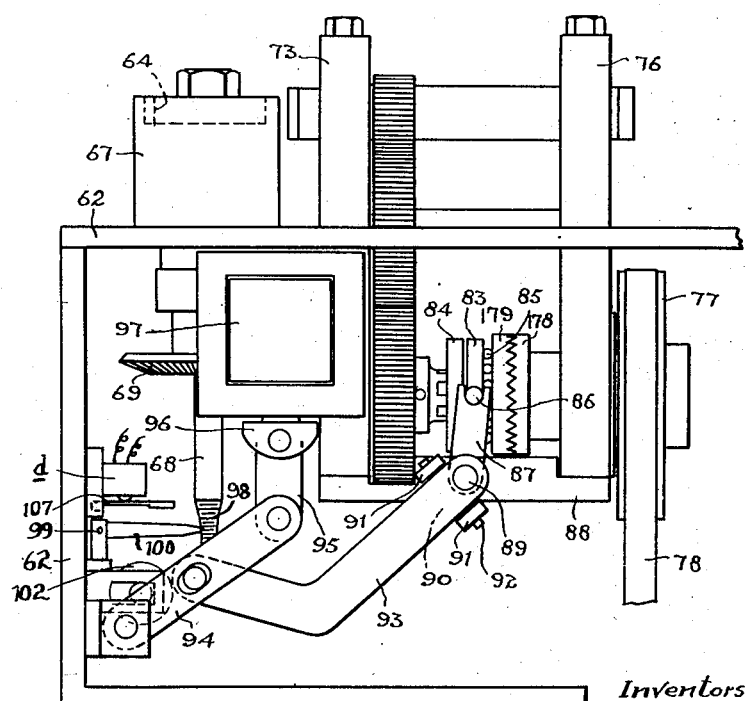
Figure 11 is an enlarged elevational view of the wire feed assembly taken from the reverse side to that shown in Figures 10 and 1.

As shown in Figure 11 a block 90 is secured on one end of the shaft 89 and has a pair of spaced end lugs 91 in which are threaded set screws 92 and a lever 93 loosely mounted on the shaft end extends between the lugs 91 and is engaged by the set screws 92 for clutch adjustment of the lever relative to the clutch operating fork.

A link 94 pivotally supported at one end from the frame 62 is connected at its other end by a link 95 to the plunger 96 of a solenoid 97 and the free end of the lever 93 is pivotally and slidably connected midway of the length of the link 94.

It will be understood that when the solenoid is energized its plunger will, through the links and lever members described, bring the clutch members into engagement so that the sleeve 74 driven by the motor will rotate the shaft 71 and drive the wire feed roller mounted on the spindle 68. Upon the solenoid being de-energized the solenoid plunger will fall, thus disengaging the clutch and instantly stopping the feed of the wire.

The lower end of driven shaft 68 of the wire feed mechanism is formed with a longitudinally concaved threaded portion 98, the centre of the curvature of which is the pivot 99 of an arm 100, the point of which engages the curved thread to be moved thereby. The pivot 99 is mounted in a fork 101 vertically journalled at 101' on the frame 62 (see Figure 12).

As shown particularly in Figures 10 and 12, an electro-magnet 102 is supported from the frame 62 below the arm 100 and an armature 103 secured to the fork 101 is operated by said magnet. A coiled wire spring 104 mounted on a stop 105 extending from frame 62 and connected to said armature, holds the armature against a stop 106 and the point of the arm 100 in engagement with the thread 98 and said arm is pulled out of engagement by the energizing of the magnet.

Pivotally mounted on the frame 62 above the thread operated arm 100 is a lever 107 which, if the arm 100 is swung high enough by the thread 98 on the feed roll spindle, will be engaged thereby so that the lever will engage and operate the switch $d$ to open the circuit controlling the wire feed, as will be later described. The lever 107 is so located that the wire feed rolls will feed enough wire for the maximum size of bundle before the arm 100 will operate the lever 107 and cut out switch $d$. During the ordinary operation of the machine the magnet 102 is for a brief interval energized upon operation of switch H as each bundle is tied to pull the arm 100 laterally out of engagement with the threaded part 98 whereby the arm under gravity returns to its lowermost position whereupon de-energization of the magnet 102, spring 104 will draw the point of arm 100 back into engagement with the threaded portion 98 of the driven shaft 68 to again be operated vertically when wire feed is recommended. If the wire should jump out of its groove, run out, or jam, and feed continued beyond that required for the maximum bundle the arm 100 will be operated by the threaded portion 98 to open the switch d and stop the feed mechanism so that damage to the machine will be avoided.

The diagram shown in Figure 5 illustrates very clearly the arrangement of the various air-controlled and controlling mechanisms.

A compressed air supply for operating the bundle compressing ram and other mechanisms is represented by the conduit 108 which is connected to the starter cylinder 109 at a point above the bottom thereof. Within the cylinder 109 is a plunger valve formed with three spaced ring flanges 110, 111, and 112 which form two annular spaces, the lower space communicating with the high pressure air conduit 108 and the upper space communicating with a low pressure conduit 113 connected with a tank 114 and with a conduit 115 leading from a port arranged adjacent to the bottom of the cylinder 5.

A conduit 116 leads from a port adjacent the bottom of the cylinder 109 to a point adjacent the top of the cylinder 5 and when the machine is not in operation, and the ram piston 5' is at the top of its stroke, the lower flange 110 of the starter valve is above the port to the conduit 116 and providing a path for air from the top of the cylinder 5 to flow through conduit 116 and conduit 117 in the bottom of cylinder 109 to the tank 114 through a check valve 118. Air from the top of the cylinder 5 also flows through a conduit 119 and a reducing valve 120 to the tank 114, thus conserving the high pressure air used to force the piston 5' downwardly and using the reduced pressure air stored in the tank for raising the piston 5' and the ram 7, the tank being provided with a relief valve 114' to prevent the pressure building up high enough to retard the exhaust from the top of the cylinder.

The starter valve plunger extends above the cylinder 109 and is connected to a starting lever 122 which is mounted on a spring-loaded pivot 122' carried by the support 121. A latch 123 of bell crank form engages and holds the starter lever down when it has been depressed and said latch and lever are released by the energizing of a solenoid 123'. The spring-loaded pivot allows sufficient extra movement of the starting lever after the plunger valve has reached the bottom of its stroke. A safety switch e, which is held open by the lever 122 closes immediately the starting lever is depressed.

The depressing of the plunger valve moves the lower flange below the port opening to the conduit 116 and pressure air flows therethrough to the top cylinder 5, thus forcing the piston 5' and the ram 7 downwardly to compress a bundle placed upon the bed plate 4. As the piston 5' moves downwardly the air below the piston flows through the conduit 115 and the space between the starter valve flanges 111 and 112 to conduit 113 and the tank 114.

A check valve 124 with a leak orifice is arranged in the conduit 115 to prevent the flow of pressure fluid to the bottom end of cylinder 5. The leak orifice allows sufficient pressure fluid to enter the bottom of the cylinder 5 to cushion the piston at the bottom of its down stroke if operated without a bundle.

The wiring diagram, Figure 6 illustrates the associated arrangement of switches and other controls.

A plunger 125 extending below the bottom face of the ram 7 engages the bundle and operates a switch f Figure 6 to apply "ground" through the switch c at the left end of the wire guide to a relay R' which energizes the solenoid 97 and starts the wire feed mechanism. When the wire reaches the switch c which has been moved, by the cable 54 connected to the ram, to a position to measure the correct length of wire to tie the bundle, it operates switch c to break the circuit to the solenoid 97 and the clutch of the wire feed is disengaged and stops the feed of wire. The switch c is of the double-throw variety and it applies "ground" to relay R².

Switch e, having been closed by depressing the starting lever 122 current is applied to relay R² closing same. This relay is of the self-holding variety and, when closed will hold closed until current source is interrupted by switch e.

An air line from 108 is provided with a branch 126 leading through a restricting valve 127 to a cylinder 128 and opening thereinto at a point adjacent the top and above the piston 129 which is spring-held upwardly.

A needle valve 130 closes an opening in the top of the cylinder 128 and is operated to open by the energizing of a solenoid 131. The area of the needle valve opening is much greater than the orifice of the restricting valve 127 and when opened it reduces the pressure in the top of the cylinder 128 allowing the spring-operated piston to move upwardly to permit air to flow from the branch line 132 to 133. The air flows through a restricting valve 134 in 133 to the bottom of the cylinder 19 to force the wire folder ram 20 upwardly to engage the wire end and fold it upwardly beside the bundle.

When the wire is lifted clear of the switch c it returns to normal but wire does not feed because a switch i engaged by the folder ram has been opened on the raising of said ram.

When the folder ram has risen sufficiently far to bend the wire upwardly, its plunger allows air to flow through a conduit 135 and air relay valve 136, depressing the plunger thereof and to the cylinder 18, lifting the folder ram 17. Air concurrently flows to the operating cylinder 137 through the flexible conduit 138 and operates the wire cutter which may be precisely the same as that disclosed in detail in Patent 2,331,818 and which is operated to its cutting position prior to the release of air to its operating cylinder by the ram-operated cable 43 as has been described.

When air is admitted to cylinder 18 the member 16 lifts the cut end of the wire and folds it along the right side of the bundle. As the wire lifts from its holding groove the switch a closes to ground thereby starting the feed through the switch d and solenoid 97. When the wire feeds forward to the switch a the circuit is again opened and the feed stopped.

It will be understood that the ram 7 moves downwardly to compress the bundle placed on the bed plate 4 immediately following the manual operation of the starting lever 122 and the rams 17 and 20 then move upwardly to bend the ends of the wires along the sides of the bundle. As the rams continue upwardly the pivotal wire-bending blocks 25 and 35 are swung inwardly, bending the wire ends over the bundle.

The ram 7 (see Fig. 15) is formed with a vertical slot 7× arranged back of the front plate 7' and extending transversely thereof from side-to-side and open at the bottom. The inwardly moving wire ends pass into the slot 7×, the right wire folding over the left.

Mounted on the plate 7' of the ram 7 is a cylinder 139 which contains a piston valve 140, the plunger 141 of which is engaged by the member 16 when it moves to the top of its stroke. A compressed air conduit connected with the supply conduit 108 enters the cylinder 139 between the end flanges of the valve 140 when it is at the bottom of its stroke. Above the valve a port connects with a conduit 142 leading to the top of a vertical cylinder 143 mounted centrally of the width of the ram 7. An exhaust conduit 144 leads from adjacent the top of the cylinder 139 and discharges to atmosphere below the cylinder 143 to cool the wire welding tools later described.

When the member 16 raises the valve 140, compressed air flows from conduit 108 to 142 and cylinder 143 (Figs. 1 and 5) depressing the plunger therein which is connected to a sliding block 145 held upwardly by coiled return springs 146 (Figs. 1 and 15), said block carrying a pair of spaced-apart fingers 147 which extend through vertical slots in the plate 7' and are held in said slots by leaf springs 148. The ends of the fingers 147 are notched and they engage the inwardly turned wire ends in the slot 7× and force them down against a welding anvil 149 fixed to the hub 149' which is pivotally mounted on an insulated bearing pin or bar 152 carried by the bracket 150 on the ram 7 and held upward against stops by the pressure against the top of the bundle.

A welding jaw member 151 is also pivotally mounted on the insulated bearing bar 152 mounted in the bracket 150 and is adapted to swing downwardly to engage the overlapped wire ends pressed down on the anvil by the fingers 147 against resistance of spring 251 connected to arm 151' of the jaw 151. Electric cables from the transformer T² mounted on the ram 7 (Fig. 4) are connected to the welding jaw 151 and through bracket 150 to the anvil 149. The welding circuit from jaw 151 to anvil 149 is completed through the overlapped wire ends which thus welds them together.

As the piston 153 in cylinder 143 moves downwardly to operate the fingers 147 as described, it uncovers a port in the cylinder to a conduit 154 which directs compressed air to a cylinder 155 mounted on the ram 7 and the plunger of this cylinder engages a bell crank lever 156 to force the welding jaw to its closed position. The spacing of the port to conduit 154 is such that the depressor fingers 147 will have moved the wire ends down upon the anvil and below the welding jaw before the jaw is operated.

A lever 157 mounted on the ram 7 (Figure 4) engages the bell crank lever 156 and as the lever 156 moves down it carries the lever 157 with it and closes the switch g. Before the welding jaw touches the wire, current is fed through switch e, switch h and switch g to the coil on relay R³ and from thence to "ground." This closes relay R³ completing circuit to the welding transformer T² and effects the welding of the wires.

The heating effect is very rapid as the current flow is high and the wires are heated simultaneously with being squeezed tightly together by the lever pressure applied.

Concurrent with the flow of pressure to the welding cylinder 155, compressed air flows from conduit 154 to a branch conduit 158, through a restricting valve 159 to an air chamber 160 and to a bellows 161. As the welder jaw 151 meets resistance, pressure builds up in the cylinder 155 and air flows into chamber 160. As the pressure continues to build the bellows operates a bell crank 162 against a tension spring 163 causing switch h to operate to break the circuit to the relay R³ and opening the welding circuit. The movement of switch h to open the welding circuit which is of the double-throw type, directs current to the solenoid 123' which releases the latch 123 holding the starter lever 122 which is then spring-operated by spring 165 to move to the released or inoperative position, pulling the starter valve to its upper position. This valve movement closes off the flow of high pressure air to conduit 116 and medium pressure air from the tank 114 is fed slowly through the leak orifice in the check valve 124 to the bottom of cylinder 5 to move the piston and the ram 7 upwardly. This movement is comparatively slow and prevents slamming of the piston. In addition an air cushion is formed at the top of the cylinder. The air within the cylinder 5 above the piston is exhausted through the conduits 116 and 119 to the tank 114.

As the starting lever 122 returns to the top of its stroke it breaks the circuit through switch e releasing the relay R² which opens the circuit to the solenoid 131 allowing valve 130 in cylinder 128 to close.

Pressure now builds up in the cylinder 128 forcing the piston down to cut off the flow of pressure air to the cylinders 19 and 18 and open the conduit to these cylinders to atmosphere through a port 166. As pressure drops in conduit 135 and the spring in the relay valve 136 overcomes same the piston opens the cylinder 18 and the wire cutter cylinder to atmosphere through a port 167.

The wire folder rams 20 and 17 thus return to the lowered position by gravity and as said rams reach the lowered position they engage and close the switches i and j which are opened automatically when these rams move upwardly to prevent operation of wire feed past the switch a while wire is being bound around the bundle.

When ram 7 moves upwardly to its top position it engages a switch k closing the circuit to ground. The relay R' closes the circuit to the clutch-operating solenoid 97 and the wire feed then feeds wire past switch a to b which then opens the circuit to relay R' and stops the feed of wire. The wire is now fed across the bed plate 4 ready for the next bundle.

It will be noted that if the starting lever 122 is operated before wire has reached the switch b the feed of wire will stop because the circuit is open on account of the ram engaging and holding the switch k open. As soon as the ram strikes the bundle the switch j closes thus forming a path to "ground" around the switches b and k starting the wire feed again.

A momentary contact switch l (Fig. 6) allows wire to be fed by hand at any time for threading or other purposes.

A contact r' shown on relay R³ is not necessary and is merely used to hold in relay by shorting out switch g in the event of chattering. Momentary contact switch m when actuated energizes solenoid 102 and may be used to reset over travel control if found necessary.

In the operation of this machine, wire from a supply coil is threaded through the feed rolls, the straightener and the cutter. The motor is energized to operate the feed and wire is fed automatically along the groove of the bar 41 until it reaches the switch b which stops the feed by de-energizing the clutch control solenoid 97 after passing over the bed plate 4.

A bundle is placed on the bed plate and the starter handle 122 is manually depressed and then held by the latch 123. This operates the ram 7 to move down and compress the bundle and the movement of the ram operates the cables 43 and 54 to adjust the wire cutter 42 and the switch c to the proper positions relative to the size of the bundle so that wire will be fed the right distance beyond the bundle on one side, the feed being stopped by switch c and cut on the other side by the cutter 42 so that when folded around the compressed bundle the ends will overlap on the welding anvil 149 of the ram.

Immediately following the stopping of the wire feed by switch c air is fed to the cylinders 19 and 18 and the cutter cylinder 137 and following the cutting of the wire the rams 20 and 17 bend the wire ends upwardly at either side of the bundle. Immediately these wire-bending rams start to rise the switches i and j are opened to open the wire feed circuit so that wire cannot be fed while the rams are raised. As the wire-bending members approach the top of their stroke they swing the members 25 and 35 inwardly bending the wire ends into the ram slot 7× and over the bundle.

Compressed air is directed by the operation of the valve in the cylinder 139 on the ram 7 to the wire depressor cylinder 143 which forces its piston 153 downwardly to cause the fingers 147 to engage the overlapping wire ends and press them down onto the anvil 149. Simultaneously air flows to the cylinder 155 on the ram 7 and operates the welding jaw to close on the wires forced down by the fingers 147.

The lever 157 moving with the lever 156 which operates the welding jaw, operates the switch g and through its operation to close the relay R³. The welding current circuit is closed and the wire ends are welded under pressure.

While the welding pressure is being applied a pressure is built up in the bellows 161 which eventually operates the switch h to open the welding circuit and to simultaneously energize the solenoid 123' to operate the latch 121 to free the starting lever 122 which is then operated by the spring 165 to return to normal. As the lever 122 returns it engages the switch e and breaks the circuit to release the relay R², and opens the circuit to the solenoid 131 allowing the starting valve to close.

On the closing of the starting valve compressed air is directed to the bottom of cylinder 5 to raise the ram and the air in top of cylinder 5 escapes through the port in the bottom of the starting cylinder. When the ram reaches the top it operates the switch k closing the wire feed circuit.

The building up of air pressure in the cylinder 128 through which pressure air is directed to the wire binder cylinders 19 and 18 causes the air in these cylinders to be released and the rams return to bottom and as they return they close the switches i and j ready for again starting the wire feed.

While the ram 7 is down and after the wire ends have been lifted the wire automatically feeds to switch a. Immediately the rams 20 and 17 return and close the switches i and j the ram 7 releases the bundle and its expansion lifts the wire from the groove 9 in the plate 8 at the front of the bed plate thus allowing wire to feed through groove 8 to switch c where it cuts the circuit and remains until the placing of a new bundle and the operation of the starting lever 122 again operates to measure the wire.

If through any cause the wire feed mechanism runs longer than the period required to feed the maximum length of wire, or if the wire should loop or jump out of the groove in the bar 41, the thread 98 on the wire feed spindle 66 will carry the thread-engaging arm upwardly till it engages the arm 107, and said arm will then operate the switch d and break the circuit to the solenoid 97 thereby de-clutching the wire feed and stopping the movement of the wire.

A machine such as described requires only the placing of the bundle upon the bed plate and the depression of the starting lever after which the entire operation of measuring, cutting, wrapping and welding the wire and the release of the bundle and the return of the parts to normal is automatically effected.

It will be readily understood that the starting lever may be so arranged that the placing of the bundle upon the bed plate will automatically operate same, either directly or by the use of an electric solenoid as may be desired.

What we claim as our invention is:

1. In a baling machine, the combination with a ram and bed plate of a reciprocating press, a slotted guide for directing wire under a bundle placed on the bed plate means for folding the wire around the bundle when compressed by the ram and means for welding the meeting ends of the wire together, of a pair of rolls for gripping and feeding the wire along said slotted guide, a motor connected to drive said feed rolls, a clutch interposed between said motor and feed rolls, a solenoid operatively connected with said clutch means for energizing said solenoid, and an electrical circuit for controlling the operation of said solenoid said latter means comprising a plurality of switch mechanisms connected in said electrical circuit and arranged in the path of movement of the wire to be operated by the wire, at least one of said switch mechanisms being movable longitudinally of the wire path to assume a control position in accordance with the movement of said ram, and means imparting movement of said ram to said slidable switch to move same inwardly toward said bed plate corresponding to the downward travel of said ram, one of the other of said switch mechanisms being arranged to maintain said electrical circuit inoperative to feed wire to said sliding switch until said ram has engaged a bundle.

2. A baling machine as claimed in claim 1 in which one of the pair of feed rolls is operatively connected with means for breaking the electric circuit to the solenoid controlling the feed rolls if said feed rolls overrun a maximum movement.

3. A baling machine as claimed in claim 1 in which one of the feed rolls is provided with a spindle formed with a threaded extension, a pivotally mounted arm engages and is swung on its pivot by said thread, and a switch is arranged in the path of said pivotal arm to break the circuit to the solenoid if said pivotal arm moves past a normal position.

4. A baling machine as claimed in claim 1 in which one of the feed rolls is formed with a threaded extension, a pivotally mounted arm engages said threaded extension, a switch is engaged by said pivotal arm, and an electromagnet is arranged to move said thread-engaging arm clear of the thread to effect the resetting of said arm.

5. In a baling machine, the combination with the ram and bed plate of a reciprocating press, a slotted guide for directing wire under a bundle placed on the press, means for folding a measured length of wire around the bundle when compressed by the ram, and means for welding the ends of the wire together, of electrical means for feeding wire to the press, electrically controlled means for operating the ram of the press, a starting lever, switches arranged in the path of movement of the wire for stopping the wire feed short of the press bed while the ram is down, means for advancing the wire across the press bed, a switch for stopping the wire feed after crossing the press bed, a travelling switch operatively connected with the ram for finally stopping the feed of wire, and electrical means controlled by the welding means for releasing the starting lever and opening the electric control circuits.

6. In a baling machine, the combination with a ram and bed plate of a reciprocating press, a slotted guide for directing wire under a bundle placed on the bed plate and means for folding a measured length of wire around the bundle when compressed by the ram, of means mounted on the ram for gripping the ends of the wire folded around the bundle, means for directing a welding current through said gripping means, means for automatically breaking the welding circuit, electrical means for feeding wire to the press, electrically controlled means for operating the folding means, a starting lever for energizing the electrically controlled means and the movement of the ram of the press, and means controlled by the welding means for returning the starting lever and press ram to their inoperative positions.

7. In a baling machine, the combination with a ram and bed plate of a reciprocating press, a fluid pressure cylinder containing the piston of said ram, a slotted guide for directing wire under a bundle placed on the bed plate of the press, electrical means for feeding wire in said guide, means for controlling the feed of wire under the bundle, means for cutting a measured length of wire, fluid pressure means for folding the wire ends upwardly on either side of the bundle and folding the ends of the wire inwardly over the bundle and electrical means for welding the ends of the wire together, of a starting lever, means controlled by said starting lever for energizing the wire feed controlling means, fluid pressure means carried on the ram for pressing the wire ends together, fluid pressure actuated means mounted on the ram for gripping and welding the wire ends, means operated by said starting lever for directing pressure fluid to said ram cylinder to lower the ram to press the bundle and to said wire bending means and wire cutting means and to the wire pressing and welding means on said ram, fluid pressure actuated timing means for releasing and returning the starting lever to normal position, and means to break the welding circuit actuated by the timing means.

8. In a device as claimed in claim 7, a piston valve connected with said starting lever having three spaced flanges, a cylinder enclosing said piston valve having dual inlets from a fluid pressure supply opening on either side of the centre flange, an outlet from said valve cylinder arranged below the top flange of the valve when the valve is raised and directed to the top of the ram cylinder, an outlet from the valve cylinder opening to atmosphere above the top flange of said valve, an outlet from said valve cylinder below the bottom valve flange when the valve is raised and leading to the bottom of said ram cylinder, and an outlet from the bottom of said valve cylinder open to atmosphere.

9. In a device as claimed in claim 7, a latch holding said starting lever depressed, a solenoid operating to release said latch, and switch means actuated by said fluid pressure actuated timing means for energizing said latch solenoid.

10. A device as claimed in claim 7, in which a cylinder mounted on the ram is connected midway of its length to a pressure fluid supply and has an outlet leading to a cylinder containing a piston operating the wire pressing means, a piston valve arranged in the first-mentioned cylinder on the ram and having a plunger operated by contact with the bundle on the lowering of the ram, said plunger opening the flow of pressure fluid to said second-mentioned wire presser operating cylinder, a cylinder having a piston and plunger operating the welding means, a conduit leading from intermediate the length of the wire presser operating cylinder to said welder operating cylinder, a conduit connected with the aforesaid conduit having a reducing valve and an expansion chamber, a bellows connected with the latter conduit, a lever operated by said bellows, a switch controlled by said bellows operatively connected to effect the return of the starting lever to a normal position, and means adapted to break the welding circuit.

11. A device as claimed in claim 7, in which a lever engages the fluid pressure actuated welding means, and a switch is engaged by said lever to close the welding circuit.

12. A device as claimed in claim 7 in which the means carried on the ram for pressing the wire ends together comprises a member vertically slidable on the ram, a spring holding said slidable member in the raised position, a fluid pressure cylinder having its piston connected to move said slidable member downwardly, a member hinged on said slidable member having fingers extending to engage the wire ends folded across the ram, and spring means for pressing said fingers into position to engage the wire ends.

13. In a baling machine, the combination with a ram and bed plate of a reciprocating press, means at one side of the ram for feeding wire under a bundle placed on the bed plate, means for folding the wire around the bundle when engaged by the ram and means for welding the ends of the wire together, of electrically operated means for governing the operation of the wire feeding means, and switch means arranged in the path of movement of the wire for controlling the operation of said governing means, said switch means comprising a switch arranged on the feed side of the ram to be engaged by the end of the wire when the ram is in operation to break the circuit of the feed governing means, a switch arranged on the side of the ram remote from the feed mechanism adapted to be engaged by the end of the wire passing across the bed plate to break the circuit of the feed governing means, and a switch movably arranged on the side of the ram remote from the feed means and operatively connected with means connected with the ram to measure the length of wire extending beyond the press on the side remote from the feed means to fold around one side and the top of the bundle to meet the wire folded around the opposite side and the top of the bundle.

14. In a baling machine, the combination with a ram and bed plate of a reciprocating press, means at one side of the ram for feeding wire under a bundle placed on the bed plate, means for folding the wire around the bundle when engaged by the ram, and means for welding the ends of the wire together, of electrically operated means for governing the operation of the wire feeding means, a grooved horizontal bar each side of the bed plate of the press to guide the wire, a movable switch adapted to be contacted by the wire end mounted on the grooved bar on the side remote from the wire feed means and controlling said governing means and being movable toward and away from the bed plate, an endless cable extending along said latter grooved bar and connected to said switch and to said ram, a wire cutter slidably mounted on the bar on the side of the ram adjacent the feed means and movable towards and away from the bed plate, and an endless cable extending along said latter grooved bar and connected to said cutter and to said ram, said cables operating the switch and cutter in unison upon ram movement.

15. In a baling machine, the combination with a ram and bed plate of a reciprocating press, means for feeding wire under a bundle or the like placed on the bed plate from one side of the bed plate, means for folding the wire around the bundle when engaged by the ram, and means for welding the ends of the wire together, of electrically operated means for operating the wire feeding means, and means for controlling said electrically operated means to govern the length of wire fed across said bed plate beneath said bundle in accordance with the size of bundle to be baled, said controlling means comprising a switch slidably mounted on the opposite side of said bed plate from which said wire is fed and arranged in the path of the wire to slide longitudinally thereof and having contact means to be engaged by said wire upon being fed to said switch to interrupt wire feed, means imparting movement of said ram to said slidable switch to move same inwardly toward said bed plate corresponding to the downward travel of said ram, and means maintaining said electrically operated means inoperative to feed wire to said sliding switch until said ram has engaged a bundle.

16. In a baling machine, the combination with a ram and bed plate of a reciprocating press, means for feeding wire under a bundle or the like placed on the bed plate, means for folding wire around the bundle engaged by the ram, and means for welding the ends of the wire together, of electrically operated means for operating the wire feeding means and switch means arranged in the path of movement of the wire for controlling the operation of said electrically operated means, said switch means comprising a plurality of switch mechanisms connected in the circuit of said electrically operated means and arranged in the path of movement of the wire to be operated by the wire, at least one of said switch mechanisms being movable longitudinal of the wire path to assume a control position in accordance with movement of said ram, and means imparting movement of said ram to said slidable switch.

17. In a baling machine, the combination with a ram and bed plate of a reciprocating press, means at one side of the ram for feeding wire under a bundle placed on the bed plate, means for folding the wire around the bundle when engaged by the ram, and means for welding the ends of the wire together, of electrically operated means for governing the operation of the wire feeding means, switch means arranged in the path of movement of the wire for controlling the operation of said governing means, said switch means including a mobile switch operatively connected with the ram to control the maximum length of travel of the wire end in accordance with the ram movement, and a mobile wire cutter operatively connected with the ram and moved in accordance with ram movement to sever the wire at a point to provide a length of wire corresponding to the size of the bundle to wrap the bundle.

FRANCES N. WALLACE,
*Executrix of the Estate of Richard Edgar Wallace, Deceased.*

THOMAS R. SYKES.

REFERENCES CITED

The following references are of record in the file of this patent:

UNITED STATES PATENTS

| Number | Name | Date |
|---|---|---|
| 1,675,426 | Ross | July 3, 1928 |
| 1,783,947 | Sommer | Dec. 2, 1930 |
| 2,331,818 | Wallace | Oct. 12, 1943 |
| 2,409,652 | Workman | Oct. 22, 1946 |